(12) United States Patent
Nicks et al.

(10) Patent No.: US 10,228,299 B2
(45) Date of Patent: Mar. 12, 2019

(54) SYSTEMS AND METHODS FOR MONITORING OPERATIVE COMPONENTS OF A VEHICLE BASED ON AMBIENT CONDITIONS

(71) Applicant: THE BOEING COMPANY, Chicago, IL (US)

(72) Inventors: Eric Lee Nicks, Defiance, MO (US); Stephen Gregory Dame, Everett, WA (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 15/239,221

(22) Filed: Aug. 17, 2016

(65) Prior Publication Data

US 2018/0052068 A1 Feb. 22, 2018

(51) Int. Cl.
| | | |
|---|---|---|
| *G01L 19/00* | (2006.01) | |
| *G01K 13/00* | (2006.01) | |
| *G01M 99/00* | (2011.01) | |
| *B64D 11/02* | (2006.01) | |

(52) U.S. Cl.
CPC .......... *G01L 19/0092* (2013.01); *B64D 11/02* (2013.01); *G01K 13/00* (2013.01); *G01M 99/00* (2013.01)

(58) Field of Classification Search
None
See application file for complete search history.

(56) References Cited

U.S. PATENT DOCUMENTS

| | | | |
|---|---|---|---|
| 9,342,481 B2 | 5/2016 | Swearingen | |
| 2015/0101701 A1* | 4/2015 | Dean | B60C 23/003 141/4 |
| 2015/0101702 A1* | 4/2015 | Dean | B60C 23/003 141/4 |
| 2015/0355000 A1* | 12/2015 | Bates | G01F 1/34 73/861.351 |

\* cited by examiner

*Primary Examiner* — Andre J Allen
(74) *Attorney, Agent, or Firm* — Joseph M. Butscher; The Small Patent Law Group, LLC

(57) ABSTRACT

A component monitoring system is configured to indirectly monitor an operative health status of an operative component. The component monitoring system includes an ambient condition sensor within a chamber, an operative component coupled to the chamber. The ambient condition sensor is configured to sample an ambient condition within the chamber when the operative component is active. The ambient condition sensor is configured to output ambient condition data indicative of the ambient condition detected by the ambient condition sensor. At least one control unit is in communication with the ambient condition sensor. The control unit(s) is configured to indirectly determine the operative health status of the operative component through an analysis of the ambient condition data.

31 Claims, 7 Drawing Sheets

SYSTEMS AND METHODS FOR MONITORING OPERATIVE COMPONENTS OF A VEHICLE BASED ON AMBIENT CONDITIONS

FIELD OF THE DISCLOSURE

Embodiments of the present disclosure generally relate to systems and methods for monitoring operative components of a vehicle, and, more particularly, to systems and methods for monitoring such operative components based on one or more detected ambient conditions.

BACKGROUND OF THE DISCLOSURE

Commercial aircraft are used to transport passengers between various locations. A typical commercial aircraft includes one or more lavatories within an internal cabin. Each lavatory includes a toilet and sink. The toilet is coupled to a vacuum system that is configured to assist in evacuating contents within the toilet as the toilet is flushed.

The vacuum system generally includes one or more vacuum generators (which may include one or more blower assist motors) that are used to assist the flushing operation. At a cruising altitude, a blower assist motor may not be used to facilitate removal of contents of the toilet upon flushing, as the pressure differential between the internal environment of the aircraft and the external environment is great enough to evacuate the contents of the toilet. When the aircraft descends, the blower assist motor is activated upon flushing of the toilet to generate sufficient vacuum force to evacuate contents of the toilet, as the pressure differential between the inside of the aircraft and the exterior environment may not be great enough to provide sufficient evacuation force. When the aircraft is on land (such as parked at a gate), the blower assist motor is activated each time a toilet is flushed in order to provide sufficient vacuum force to remove the contents of the toilet.

Over time, the blower assist motor may become less effective, as numerous uses over long periods of time may cause normal wear and tear. As can be appreciated, blower assist motors are replaced as their effectiveness diminishes.

It has been found that airlines may incur significant delays due to lavatory maintenance. For example, if a blower assist motor needs to be replaced, a significant delay (for example, 15-120 minutes) may be caused as maintenance personnel remove and replace the blower assist motor. Delays may lead to customer irritation and/or dissatisfaction, as well as increased operational costs for airlines.

SUMMARY OF THE DISCLOSURE

A need exists for a system and method for monitoring components of a vehicle, such as an aircraft. A need exists for a system and method of predicting when a component of a vehicle is to be replaced, such that the component can be replaced at a time when the vehicle is not in service (thereby eliminating, minimizing, or reducing departure delays and associated costs).

With those needs in mind, certain embodiments of the present disclosure provide a component monitoring system that is configured to indirectly monitor an operative health status of an operative component. The component monitoring system includes an ambient condition sensor within a chamber. An operative component is coupled to the chamber. The ambient condition sensor is configured to sample an ambient condition within the chamber when the operative component is active. The ambient condition sensor is configured to output ambient condition data indicative of the ambient condition sampled by the ambient condition sensor. At least one control unit is in communication with the ambient condition sensor. The control unit is configured to indirectly determine the operative health status of the operative component through an analysis of the ambient condition data. The ambient condition sensor may not be coupled to the operative component.

In at least one embodiment, the ambient condition sensor is an ambient air pressure sensor; the chamber is a lavatory onboard a vehicle; and the operative component is a vacuum generator of a vacuum sub-system coupled to a toilet within the lavatory. In at least one embodiment, the ambient condition sensor is an ambient temperature sensor.

The control unit(s) may be configured to store historical data regarding a plurality of operative health status stages of the operative component. The control unit(s) may be configured to compare the ambient condition data with the plurality of operative health status stages of the operative component to determine the operative health status of the operative component. The plurality of operative health status stages may include proper or normal functioning, diminished capacity, and impending inoperability.

The ambient condition sensor may be in a dormant state at least for a portion of time when the operative component is inactive.

The component monitoring system may also include one or more environmental sensors in communication with the control unit(s). The control unit(s) may be configured to correlate one or more environmental parameters detected by the environmental sensor(s) with the ambient condition data. The environmental parameters may include one or more parameters such as altitude, latitudinal position, longitudinal position, a velocity of a vehicle, or an acceleration of the vehicle.

In at least one embodiment, at least one control unit is onboard a vehicle. Additionally, or alternatively, at least one control unit is within a monitoring center that is remotely located from the chamber and the vehicle.

In at least one embodiment, the control unit(s) is configured to predict a time of replacement of the operative component based on the analysis of the ambient condition data.

Certain embodiments of the present disclosure provide a component monitoring method for indirectly monitoring an operative health status of an operative component. The component monitoring method includes disposing an ambient condition sensor within a chamber, coupling an operative component to the chamber, using the ambient condition sensor to sample an ambient condition within the chamber when the operative component is active, outputting ambient condition data (via the ambient condition sensor) that is indicative of the ambient condition sampled by the ambient condition sensor, communicatively coupling at least one control unit to the ambient condition sensor, analyzing the ambient condition data with the control unit(s), and indirectly determining the operative health status of the operative component through the analyzing.

The method may include storing historical data regarding a plurality of operative health status stages of the operative component in at least one data storage unit. The analyzing may include comparing the ambient condition data with the plurality of operative health status stages of the operative component.

The method may also include correlating one or more environmental parameters detected by one or more environmental sensors with the ambient condition data. The method may also include using the control unit(s) to predict a time of replacement of the operative component based on the analyzing.

Certain embodiments of the present disclosure provide a vehicle that includes a lavatory including a toilet coupled to a vacuum sub-system having at least one operative component coupled to the lavatory. An ambient condition sensor is positioned within the chamber. The ambient condition sensor is configured to sample an ambient air pressure within the lavatory when the toilet is flushed. The ambient condition sensor is configured to output ambient pressure data indicative of the ambient air pressure sampled by the ambient condition sensor. A control unit onboard the vehicle is in communication with the ambient condition sensor. The control unit is configured to indirectly determine the operative health status of the operative component through an analysis of the ambient pressure data within the lavatory during operation of the operative component.

DETAILED DESCRIPTION OF THE DISCLOSURE

Figure 1:
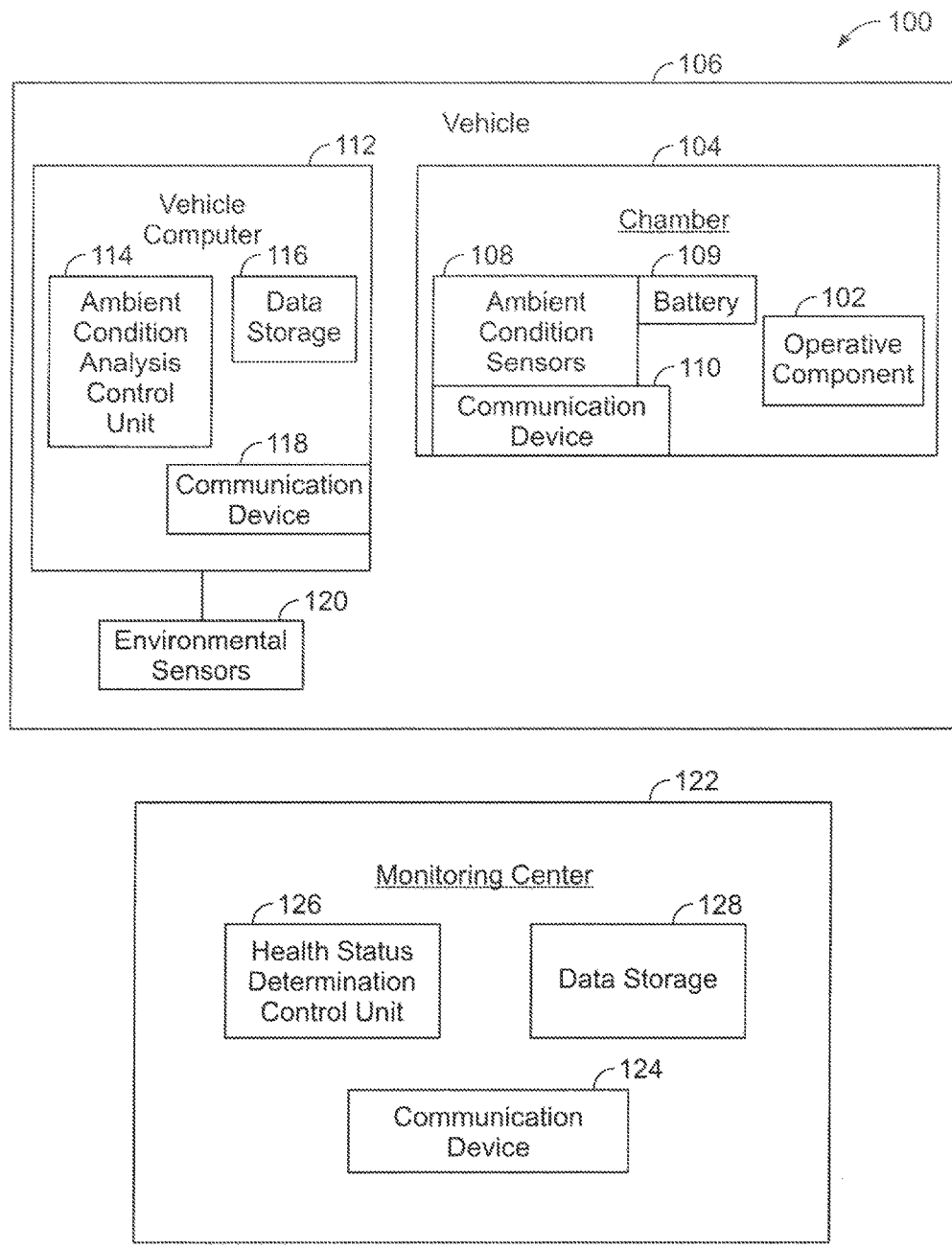
FIG. 1 is a schematic diagrammatic representation of a component monitoring system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a system for monitoring one or more components of a vehicle. The system includes at least one ambient condition sensor within a chamber of the vehicle. In at least one embodiment, the ambient condition sensor is a pressure sensor that is configured to detect air pressure within the chamber. In at least one other embodiment, the ambient condition sensor is a temperature sensor that is configured to detect a temperature within the chamber. The chamber may be a lavatory within the vehicle.

The ambient condition sensor samples, senses, or otherwise detects (for example, a sampling is an example of a detection) an ambient condition within the chamber during operation of a component of the vehicle. The component may be a portion of a vacuum flush system, such as a vacuum generator (which may include a blower assist motor). The detected ambient condition(s) within the chamber is used to indirectly monitor the operative health of the component. For example, the detected ambient condition(s) may be analyzed, such as by one or more control units, which may compare the ambient conditions with ambient condition data that is correlated with various stages of operative health of the component. Based on historical data of ambient conditions during operation of similar components, the control unit(s) is able to predict if and when the component should be replaced.

In at least one embodiment, the ambient condition sensor includes a microelectronic mechanical systems (MEMS) pressure sensor that is used to indirectly characterize parameters and pressure profiles associated with vacuum flush toilets in aircraft lavatories, such as by detecting pressure changes coincident with flush cycles. The control unit(s) may then be used to predict anomalies that are indicative of a need to replace one or more components of the vacuum flush toilets. The control unit(s) is configured to analyze flush cycle differential atmospheric pressure profiles for a given toilet, all toilets on a particular airplane of the same model, and/or toilets across an entire fleet of aircraft of a particular type.

The systems and methods may be used with respect to various components of various vehicles. For example, the monitoring systems and methods may be used with respect to various components of a vacuum flush system of an aircraft, such as a vacuum generator or pump, a toilet flush valve, a vacuum waste line, and the like. Data detected by the ambient condition sensor(s) is collected and may be sent (either via wired or wireless connection) to vehicle systems and/or a central monitoring center. Various parameters such as flush cycle counts, intervals between flush cycles, distribution of use compared to other lavatories onboard a given airplane, statistics on lavatory usage in different phases of flight or times of operation, may be compiled and sent to the monitoring center.

Certain embodiments of the present disclosure provide a method of using an ambient pressure sensor located inside a lavatory of a vehicle to log pressure data for each and every flush of a toilet on the vehicle. The method may also include wirelessly transmitting data collected by the ambient pressure sensor to airplane systems and/or ground based aircraft health monitoring data centers, which are configured to determine diagnostics and/or prognostics of one or more components of the lavatory, such as a vacuum generator, a toilet flush valve, a vacuum waste line, and/or the like.

The ambient pressure sensor may include or be coupled to a battery. The ambient pressure sensor may be dormant (for example, in a sleep mode) for intervals between flush cycles. The ambient pressure sensor may transmit data in batches. In at least one embodiment, a handheld device (such as a smart phone) may be used to collect data from the ambient pressure sensor.

FIG. 1 is a schematic diagrammatic representation of a component monitoring system 100, according to an embodiment of the present disclosure. The component monitoring system 100 is used to indirectly monitor an operative component 102 that coupled to a chamber 104 of a vehicle 106. The operative component 102 is coupled to the chamber 104 in that the operative component 102 is within the chamber 104, proximate to the chamber, connected to the chamber 104, or the like, such that operation of the operative component 102 affects one or more ambient conditions within the chamber 104. The operative component 102 may be or include a vacuum generator, one or more valves, a vacuum waste line, and/or the like of a vacuum sub-system. The chamber 104 may be a lavatory onboard the vehicle 106.

The component monitoring system 100 includes one or more ambient condition sensors 108 within the chamber 104. For example, the ambient condition sensors 108 may include one or more of an ambient air pressure sensor or an ambient air temperature sensor within the chamber 104. In at least one embodiment, the ambient condition sensor 108 includes an air pressure sensor, barometer, a microelectronic mechanical system (MEMS) solid state pressure sensor, and/or the like that is configured to detect air pressure within the chamber 104. In at least one embodiment the ambient condition sensor 108 includes an air temperature sensor, such as a thermometer, that is configured to detect air temperature within the chamber 104.

The ambient condition sensor 108 may be coupled to a battery 109, which provides power to the ambient condition sensor 108. In at least one other embodiment, the ambient condition sensor 108 may be coupled to another power source, such as a source of electrical power within the vehicle 100.

The ambient condition sensor 108 includes or is otherwise coupled to a communication device 110, such as an antenna, transceiver, wired or wireless communication port (for example, an Ethernet, Wi-Fi, Bluetooth Low Energy (BLE) Zigbee, or other such connection), and/or the like. In at least one embodiment, the ambient condition sensor 108 includes a memory or other such data storage unit that is configured to store ambient condition data detected by the ambient condition sensor 108.

The vehicle 106 includes an onboard vehicle computer 112 (which may be or otherwise include one or more servers) that includes an ambient condition analysis control unit 114 coupled to a data storage unit 116. The vehicle computer 112 also includes a communication device 118, such as an antenna, transceiver, wired or wireless communication port (for example, an Ethernet, Wi-Fi, BLE, Zigbee, internet, or other such connection), and/or the like. One or more environmental sensors 120 may be coupled to the vehicle computer 112, such as through one or more wired or wireless connections. The environmental sensors 120 may include an altimeter that is configured to detect an altitude of the vehicle, a global positioning system that is configured to detect a latitudinal and longitudinal position of the vehicle 106, and/or the like. The environmental sensors 120 are coupled to the ambient condition analysis control unit 114, such as through one or more wired or wireless connections. The vehicle computer 112 is configured to determine various environmental parameters of the vehicle, such as altitude, position, velocity, acceleration, and/or the like. The vehicle computer 112 may be in communication with the ambient condition sensor 108, such as through the communication devices 110 and 118.

The component monitoring system 100 also includes a monitoring center 122, which may be remotely located from the vehicle 106. For example, the monitoring center 122 may be a ground-based station that is in communication with the vehicle 106 through one or more communication devices 124, such as one or more antennas, transceivers, internet connections, and/or the like. The monitoring center 122 may be or include one or more servers. In at least one embodiment, the monitoring center 122 includes a health status determination control unit 126 coupled to a data storage unit 128.

In operation, the ambient condition sensor 108 samples, detects, or otherwise senses an ambient condition within the chamber 104 during operation of the operative component 102. For example, the ambient condition sensor 108 samples an ambient air pressure within the chamber 104 (such as a lavatory) when a toilet within the chamber 104 is flushed. The operative component 102 may be a vacuum generator coupled to the toilet. The ambient condition sensor 108 may not be directly coupled to the operative component 102. The ambient condition sensor 108 does not directly sense an operative attribute of the operate component 102. For example, the ambient condition sensor 108 does not directly sense an electrical output of the operative component 102. Instead, the ambient condition sensor 108 samples an ambient condition (such as air pressure or air temperature) of the chamber 104 during operation of the operative component 102.

During each operation of the operative component 102 (or a sub-system that includes the operative component 102), the ambient condition sensor 108 samples one or more ambient conditions within the chamber 104. For example, the operative component 102 may be a vacuum generator of a vacuum flush toilet system of a lavatory. During each flush (or, optionally, after a predetermined number of flushes) of the vacuum flush toilet system, the ambient condition sensor 108 is activated to sample an ambient air pressure within the chamber 104 (for example, the lavatory). The ambient condition sensor 108 may include or be coupled to a memory or other such data storage unit that stores ambient condition data (such as air pressure data) sampled by the ambient condition sensor 108. The ambient condition sensor 108 may transmit the air pressure data to the vehicle computer 112 in batches (or each time the ambient condition sensor 108 samples the air pressure data) via the communication device 110. By transmitting data to the vehicle computer 112 in batches (instead of transmitting each time data is collected), the ambient condition sensor 108 conserves energy (such as battery power).

The vehicle computer 112 receives the transmitted ambient condition data from the ambient condition sensor 108 via the communication device 118. The ambient condition data is stored in the data storage unit 116 (such as one or more memories). The ambient condition analysis control unit 114 analyzes the ambient condition data stored within the data storage unit 116. In at least one embodiment, the ambient condition analysis control unit 114 compares the ambient condition data with a database of ambient condition data related to ambient conditions within a chamber during various health stages of the operative component 102. For example, the various health stages may be a properly functioning operative component, a diminished capacity (that is, functioning at less than optimal performance) operative component, an impending inoperable component (that is, a predetermined time until the operative component is inoperable), and/or an inoperable component. The ambient condition analysis control unit 114 may compare the ambient condition data with stored data regarding the various health stages to determine when the operative component 102 is to be replaced before the operative component 102 is inoperable. The control unit 114 may send alerts to an operator, attendant, or the like onboard the vehicle 112 based on the health status of the operative component 102, as determined by a comparison of the ambient condition data received from the ambient condition sensor 108 and component health stage data stored within the data storage unit 116.

As an example, as a toilet within the chamber 104 is flushed, the ambient condition sensor 108 samples ambient air pressure within the chamber 104. The vehicle computer 112 receives the sampled ambient air pressure as ambient air pressure data from the ambient condition sensor 108. The ambient condition analysis control unit 114 compares the received ambient air pressure data with a database of ambient air pressure data correlated with predetermined health stages of the operative component 102. If the received ambient air pressure data is within a range of ambient air pressure data that correlates with a properly functioning operative component, the ambient condition analysis control unit 114 may determine that the operative component is properly functioning. If, however, the received ambient air pressure data is out of the range of ambient air pressure correlated with a properly functioning operative component, the control unit 114 may then determine a predicted time until the operative component 102 will be inoperable.

The predicted time until inoperability may be determined based on historical data of air pressure data from one or more other operative components. For example, based on historical data (which may be stored in the data storage unit 116 or the data storage unit 128), the control unit 114 may determine that a first sign of eventual inoperability arises when the ambient air pressure data surrounding or otherwise proximate to an operative component drops (or exceeds) a certain percentage in relation to a normal health range. Based on past historical data, a predicted time until inoperability may be a particular time period from the time the deviation first appears, such as two months. In this manner, the control unit 114 may send an alert signal (such as an audio signal via a speaker, and/or a visual signal on a monitor, screen, or the like) that the operative component 102 should be replaced within two months. In this manner, the operative component 102 may be replaced when the vehicle 106 is not in service in advance of the predicted date of inoperability, thereby minimizing or otherwise reducing any vehicle service delays.

In at least one embodiment, the ambient condition analysis control unit 114 correlates environmental data (such as vehicle altitude, latitudinal position, longitudinal position, velocity, acceleration, and/or the like) with the ambient condition data sampled by the ambient condition sensor 108. For example, each health status range of the operative component 102 may vary at different altitudes. An ambient air pressure range of a healthy or otherwise properly-functioning operative component 102 may be greater or lesser at different altitudes, for example. The component monitoring system 100 may correlate vehicle data (such as altitude, position, and/or the like) with historical ambient condition data and the actual ambient condition data sampled by the ambient condition sensor 108 to provide a more detailed and accurate health status of the operative component 102. Alternatively, the component monitoring system 100 may not utilize vehicle data when determining an operational health status of the operative component 102.

The monitoring center 122 may receive and compile ambient condition data and/or vehicle data from numerous vehicles to determine the historical data for operative components. For example, the monitoring center 122 may compile ambient condition data from a fleet of vehicles 106 over period of time (for example, a year, two year, three years, or more) to determine historical trends of ambient conditions proximate to operative components of the vehicles. The data received from the vehicles is stored in the data storage unit 128. The health status determination control unit 126 analyzes the stored data to determine historical trends of ambient conditions that correlate to normal health, diminished capacity health, impending inoperability health, and inoperability health stages for the class of operative components 102. The various health stages may be determined based on numerous operative components of numerous vehicles over a predetermined time frame (for example, a week, a month, a year, or more) to provide guideposts for predicting the operable remaining lifetime of the operative component 102.

In at least one embodiment, the control unit 114 and/or the control unit 126 stores historical data regarding a plurality of operative health status stages of the operative component 102. The control unit 114 and/or the control 126 compares the received ambient condition data from the ambient condition sensor 108 with the plurality of operative health status stages of the operative component to determine an operative health status of the operative component 102 onboard the vehicle 106. The operative health status stages may include proper functioning, diminished capacity, impending inoperability, and/or the like.

In at least one embodiment, the vehicle 106 is in communication with the monitoring center 122, which may provide diagnostics and prognostics for the operative component 102 based on the determined and stored historical data. In at least one other embodiment, the monitoring center 122 may communicate the historical data to the vehicle computer 112, which may store the historical data in the data storage unit 116.

Alternatively, the component monitoring system 100 may not include the monitoring center 122. In such an embodiment, the vehicle computer 112 may have the historical data pre-stored in the data storage unit 116. In at least one other embodiment, the vehicle computer 112 may determine historical data based on ambient conditions detected by the ambient condition sensor 108 over time. In at least one other embodiment, the component monitoring system 100 may not utilize historical data regarding ambient conditions surrounding or otherwise proximate to operative components.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, each of the control units 114 and 126 may be or include one or more processors that are configured to control operation of the component monitoring system 100. For example, the control units 114 and/or 126 may be or include one or more data loggers, one or more data servers, one or more network servers, and/or the like, that are configured to gather and/or analyze data, as described in the present application. In at least one embodiment, the control units 114 and 126 are configured to be in bi-directional communication with one another.

The control units 114 and 126 may be configured to execute a set of instructions that are stored in one or more data storage units or elements (such as one or more memories), in order to process data. For example, the control units 114 and 126 may include or be coupled to one or more memories. The data storage units may also store data or other information as desired or needed. The data storage units may be in the form of an information source or a physical memory element within a processing machine.

The set of instructions may include various commands that instruct the control units 114 and 126 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control units 114 and 126. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units 114 and 126 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
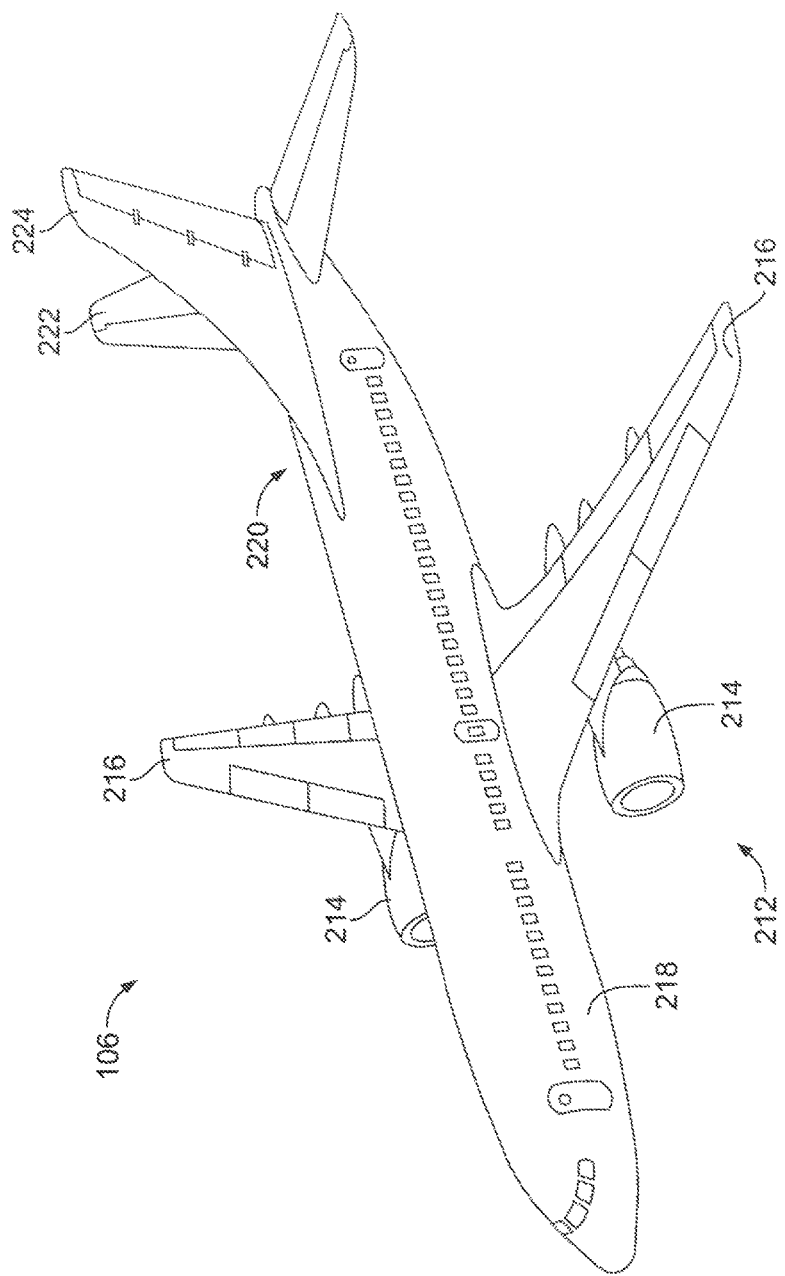
FIG. 2 is a diagrammatic representation of a perspective top view of an aircraft, according to an embodiment of the present disclosure.

FIG. 2 is a diagrammatic representation of a perspective top view of an aircraft 106, according to an embodiment of the present disclosure. The aircraft 106 is an example of the vehicle 106, shown and described with respect to FIG. 1. The aircraft 106 includes a propulsion system 212 that may include two turbofan engines 214, for example. Optionally, the propulsion system 212 may include more engines 214 than shown. The engines 214 are carried by wings 216 of the aircraft 106. In other embodiments, the engines 214 may be carried by a fuselage 218 and/or an empennage 220. The empennage 220 may also support horizontal stabilizers 222 and a vertical stabilizer 224.

The fuselage 218 of the aircraft 106 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin. The internal cabin includes one or more chambers, such as lavatories, for example.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings. As an example, embodiments of the present disclosure may be used to monitor the operational health status of one or more operative components within a building.

Figure 3A:
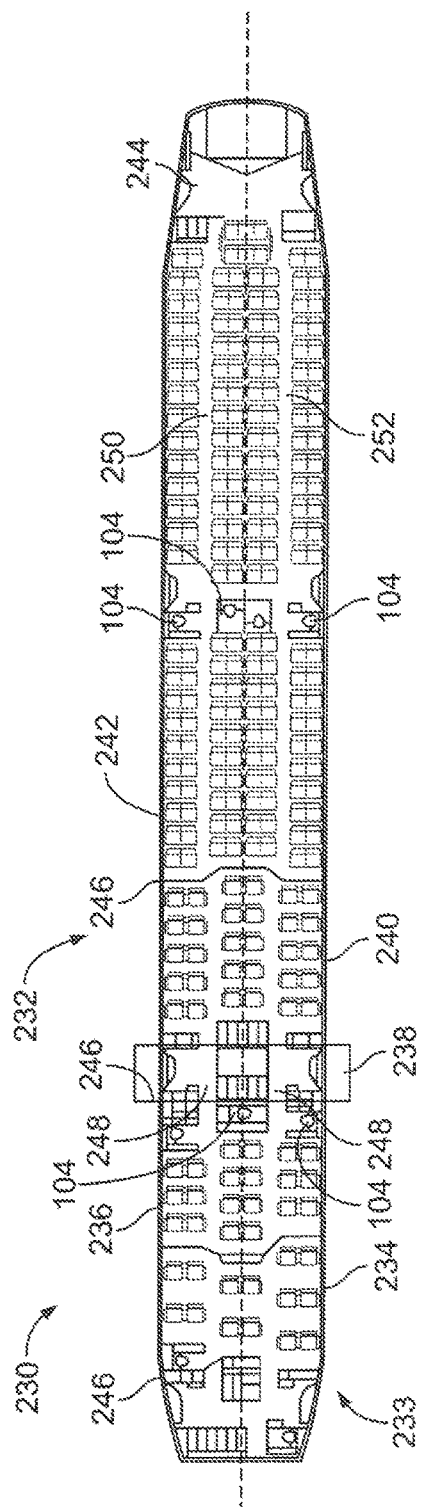
FIG. 3A is a diagrammatic representation of a top plan view of an internal cabin of an aircraft, according to an embodiment of the present disclosure.

FIG. 3A is a diagrammatic representation of a top plan view of an internal cabin 230 of an aircraft, according to an embodiment of the present disclosure. The internal cabin 230 may be within a fuselage 232 of the aircraft. For example, one or more fuselage walls may define the internal cabin 230. The internal cabin 230 includes multiple sections, including a front section 233, a first class section 234 (or first class suites, cabins, for example), a business class section 236, a front galley station 238, an expanded economy or coach section 240, a standard economy or coach section 242, and an aft section 244. The internal cabin 230 may include multiple chambers 104, such as lavatories and galley stations, dispersed throughout its sections and stations. It is to be understood that the internal cabin 230 may include more or less sections than shown. For example, the internal cabin 230 may not include a first class section, and may include more or less galley stations than shown. Each of the sections may be separated by a cabin transition area 246, which may include class divider assemblies between aisles 248.

As shown in FIG. 3A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

One or more chambers 104, such as lavatories, may be located within the internal cabin 230. The lavatories 104 may include toilets and ambient pressure sensors 108, such as described above with respect to FIG. 1.

Figure 3B:
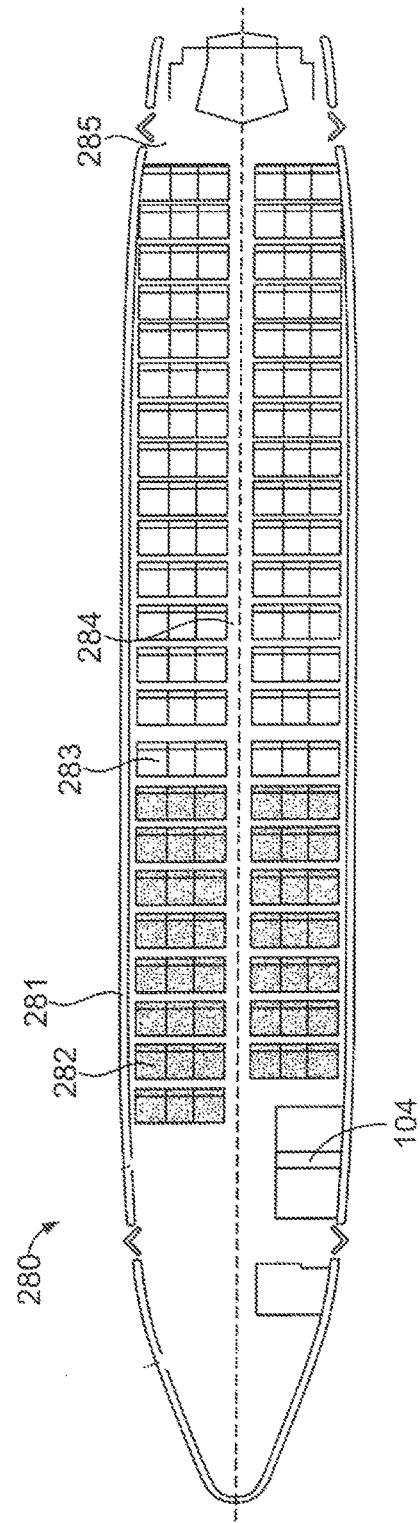
FIG. 3B is a diagrammatic representation of a top plan view of an internal cabin of an aircraft, according to an embodiment of the present disclosure.

FIG. 3B is a diagrammatic representation of a top plan view of an internal cabin 280 of an aircraft, according to an embodiment of the present disclosure. The internal cabin 280 may be within a fuselage 281 of the aircraft. For example, one or more fuselage walls may define the internal cabin 280. The internal cabin 280 includes multiple sections, including a main cabin 282 having passenger seats 283, and an aft section 285 behind the main cabin 282. It is to be understood that the internal cabin 280 may include more or less sections than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

One or more chambers 104, such as lavatories, may be located within the internal cabin 280. The lavatories 104 may include toilets and ambient pressure sensors 108, such as described above with respect to FIG. 1.

Figure 4:
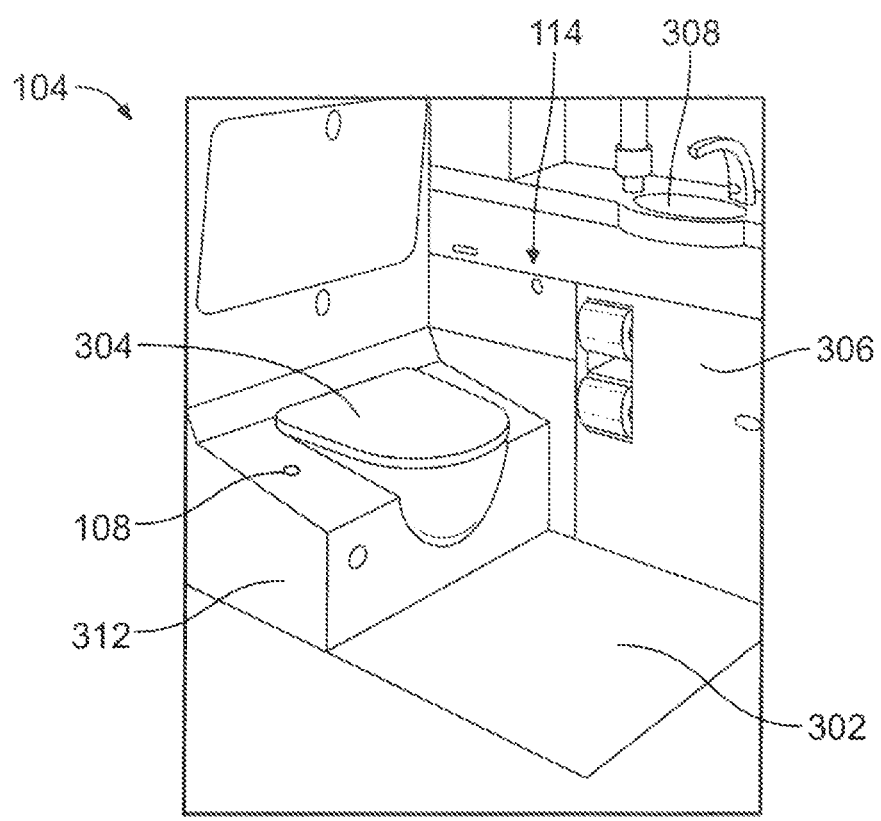
FIG. 4 is a diagrammatic representation of a perspective internal view of a lavatory, according to an embodiment of the present disclosure.

FIG. 4 is a diagrammatic representation of a perspective internal view of a lavatory 104, according to an embodiment of the present disclosure. As noted, the lavatory 104 is an example of the chamber 104 shown and described with respect to FIG. 1. The lavatory 104 may be onboard an aircraft, as described above. Optionally, the lavatory 104 may be onboard various other vehicles. In other embodiments, the lavatory 104 may be within a fixed structure, such as a commercial or residential building.

The lavatory 104 includes a base floor 302 that supports a toilet 304, cabinets 306, and a sink 308. The ambient condition sensor 108 is mounted at a location within the lavatory 104. As shown, the ambient condition sensor 108 is mounted on a housing 312 of the toilet 304. Optionally, the ambient condition sensor 108 may be secured to various other portions of the lavatory 104.

In at least one embodiment, the ambient condition sensor 108 is an air pressure sensor that is configured to detect, sample, and/or otherwise sense ambient air pressure within the lavatory 104 each time the toilet 304 is flushed. The toilet 304 may be coupled to a sub-system that includes various operative components, such as a vacuum generator, one or more valves, and/or the like. As described above, the ambient condition sensor 108 may sample an ambient air pressure within the lavatory 104 each time the toilet 304 is flushed in order to indirectly monitor the health status of one or more operative components of the toilet 304. For example, in at least one embodiment, air pressure within the lavatory 104 that is detected each time the toilet 304 is flushed is correlated with a health status of an operative component, such as a vacuum generator. In this manner, the ambient condition sensor 108 does not directly measure an output of the vacuum generator, but, instead, the ambient air pressure within the lavatory 104 each time the toilet 304 is flushed. The detected ambient air pressure is analyzed by the control unit 114 and/or the control unit 126 (shown in FIG. 1) in relation to various pressure signatures correlated with operative components at various health stages in order to determine an operational health status of the vacuum generator.

As an example, the ambient condition sensor 108 may sample air pressure at a pressure reading sample rate of 1000 samples per second during a flush interval, although the pressure reading sample rate may be greater or less than 1000 samples per second. The sampled data may be a time series of pressure reading that span a flush event cycle, as opposed to just a single data point.

In at least one other embodiment, the ambient condition sensor 108 is a temperature sensor that detects a temperature within the lavatory 104 each time the toilet 104 is flushed (or optionally, after a predetermine number of flushes). The detected ambient air temperature is analyzed by the control unit 114 and/or the control unit 126 (shown in FIG. 1) in relation to various temperature signatures correlated with operative components at various health stages in order to determine a operational health status of the vacuum generator.

Figure 5:
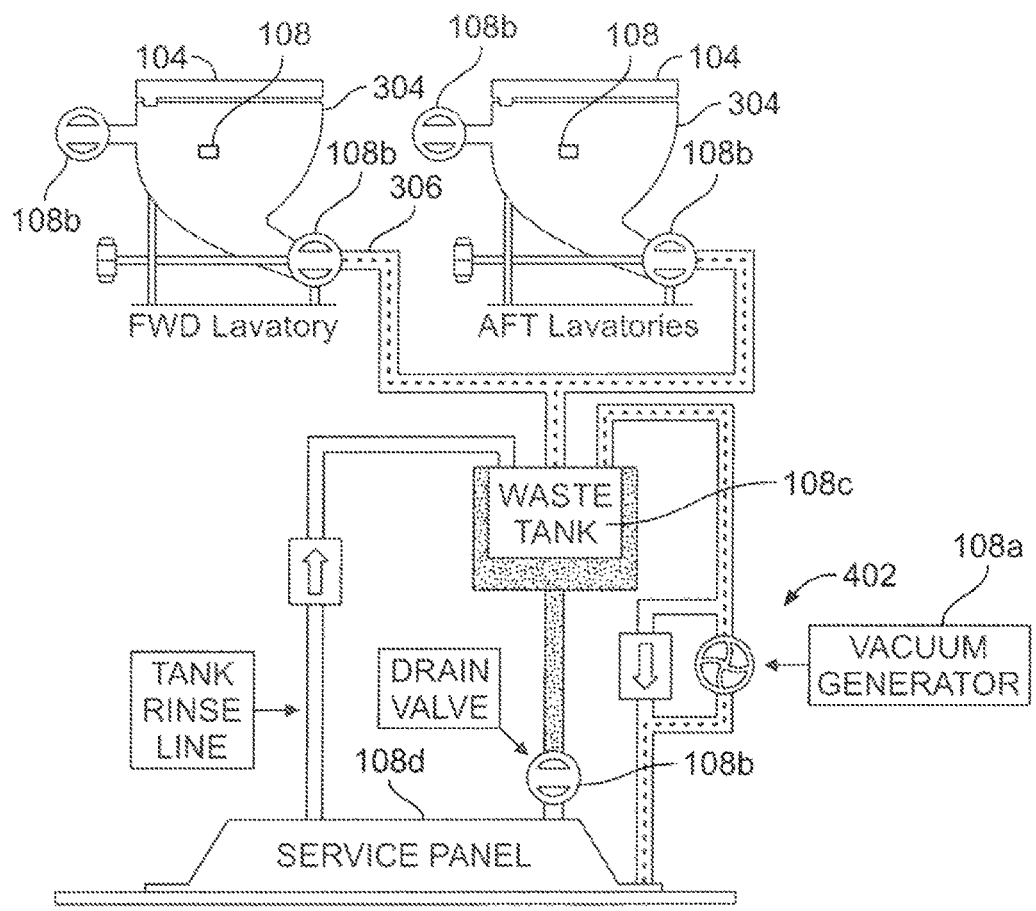
FIG. 5 is a schematic diagrammatic representation of lavatories aboard a vehicle, according to an embodiment of the present disclosure.

FIG. 5 is a schematic diagrammatic representation of lavatories 104 aboard a vehicle, according to an embodiment of the present disclosure. Each lavatory 104 is an example of a chamber 104 shown in FIG. 1. Ambient condition sensors 108 may be within the lavatories 104. The toilets 304 may be part of or coupled to a vacuum sub-system 402 that may be operatively coupled to the toilets 304. The vacuum sub-system 402 may be secured within a portion of a vehicle, such as within a fuselage of an aircraft.

The vacuum sub-system 402 may include numerous operative components 108, such as shown in FIG. 1. For example, the vacuum system 402 may include a vacuum generator 108a, valves 108b, a waste tank 108c, switches, and/or the like.

The waste tank 108c retains waste that is flushed by the toilets 304. A waste tank service panel 108d may be located within a bottom aft portion of a fuselage of an aircraft. Waste lines connect the toilets 304 to the waste tank 108c.

A vacuum in the waste tank 108c pulls the waste from the toilets 304 into the waste tank 108. Below a certain altitude (such as 16,000 feet), the vacuum generator 108a (which may a blower assist motor) is used to at generate the vacuum, at least in part. Above a certain altitude (such as 16,000 feet), the pressure differential between the interior of the aircraft and the outside atmosphere causes the vacuum.

Each toilet 304 may have a flush switch that connects to a flush control unit (FCU). When an individual pushes the flush switch, the FCU starts a flush cycle. During the flush cycle, a valve 108b opens and waste moves from the toilet 304 into the waste tank 108c, and potable water flushes the toilet.

Figure 6:
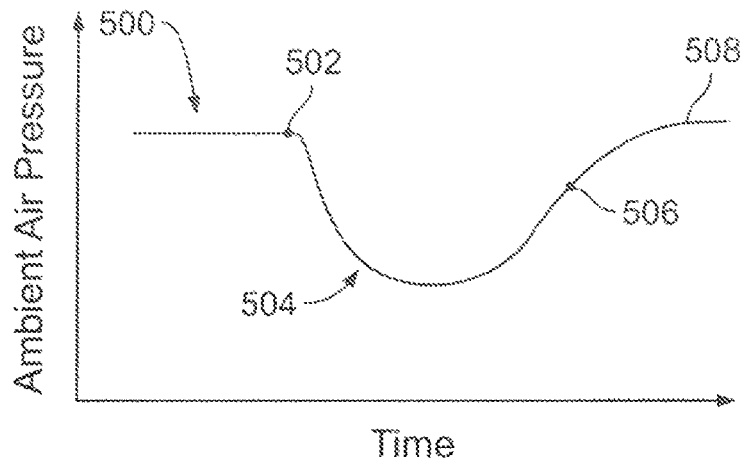
FIG. 6 is a simplified diagrammatic representation of an example of a pressure waveform associated with a properly functioning operative component, according to an embodiment of the present disclosure.

FIG. 6 is a simplified diagrammatic representation of an example of a pressure waveform 500 associated with a properly functioning operative component, according to an embodiment of the present disclosure. Referring to FIGS. 1 and 6, the pressure waveform 500 relates to ambient condition data detected by the ambient sensor 108, which may be an air pressure sensor. The pressure waveform 500 is stable until point 502, at which a toilet is flushed, and a valve opens, thereby causing a vacuum force depression 504. As the flush cycle proceeds, the valve is closed at 506, and the pressure returns to a stable state 508.

The operative component 108 may be a vacuum generator, for example. The monitoring center 122 may receive pressure sensor data from numerous vehicles over a period of time and determine that a pressure waveform that is the same or substantially the same (for example, within a predetermined acceptable percentage or range) as that shown in FIG. 6 is indicative of a normally operating operative component 108. That is, the monitoring center 122 may determine that the waveform 500 represents ambient air pressure in relation to a properly functioning operative component 102 based on historical data of numerous operative components operating over a particular time period. Thus, actual pressure data sampled by the ambient condition sensor 108 is compared by one or both of the ambient condition analysis control unit 114 or the health status determination control unit 126 in relation to a waveform template similar to the waveform 500 shown in FIG. 6. If the actual pressure data waveform as output by the ambient condition sensor 108 during a flush of the toilet is the same or substantially similar to the waveform template, the control unit 114 and/or the health status determination control unit 126 determines that the operative component 102 is properly functioning, and does not need to be replaced.

It is to be understood that the waveform 500 is merely a simplified example. Various other waveforms may be representative of ambient air pressure in relation to a properly functioning operative component 108.

Figure 7:
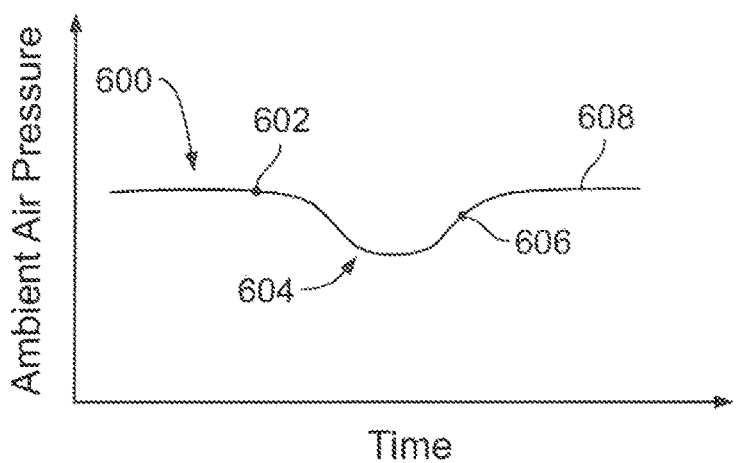
FIG. 7 is a simplified diagrammatic representation of an example of a pressure waveform associated with a diminished capacity operative component, according to an embodiment of the present disclosure.

FIG. 7 is a simplified diagrammatic representation of an example of a pressure waveform 600 associated with a diminished capacity operative component, according to an embodiment of the present disclosure. Referring to FIGS. 1 and 7, the pressure waveform 600 relates to ambient condition data detected by the ambient sensor 108, which may be an air pressure sensor. The pressure waveform 600 is stable until point 602, at which a toilet is flushed, and a valve opens, thereby causing a vacuum force depression 604. As the flush cycle proceeds, the valve is closed at 606, and the pressure returns to a stable state 608.

As shown, the vacuum force depression 604 may be of less magnitude and/or duration than the vacuum force depression 504 shown in FIG. 6. The vacuum force depression 504 may be indicative of a diminished capacity operative component, as determined by historical data stored in the data storage unit 128 of the monitoring center 122, for example. The diminished capacity may be determined based on a predetermined difference between the depressions 504 and 604. For example, based on historical data, the health status determination control unit 126 may determine that a 10% change between the depressions 504 and 604 indicates a diminished capacity operative component that should be changed within a predetermined time period (such as within one year), based on the historical data. The monitoring center 122 may determine that the waveform 600 represents ambient air pressure in relation to a diminished capacity operative component 102 based on historical data of numerous operative components operating over a particular time period. Thus, actual pressure data detected by the ambient condition sensor 108 is compared by one or both of the ambient condition analysis control unit 114 or the health status determination control unit 126 in relation to a waveform template similar to the waveform 600 shown in FIG. 7. If the actual pressure data waveform as output by the ambient condition sensor 108 during a flush of the toilet is the same or substantially similar to the waveform template, the control unit 114 and/or the control unit 126 determines that the operative component 102 is functioning at a diminished capacity, and should be replaced within a predetermined time period.

It is to be understood that the waveform 600 is merely a simplified example. Various other waveforms may be representative of ambient air pressure in relation to a diminished capacity operative component 108.

Figure 8:
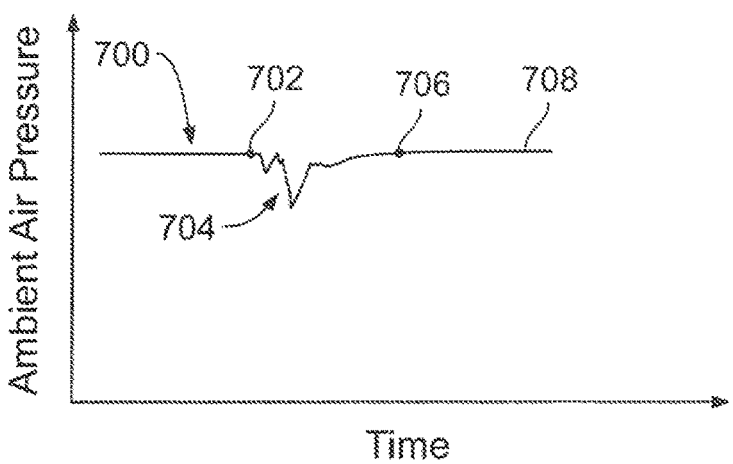
FIG. 8 is a simplified diagrammatic representation of an example of a pressure waveform associated with an impending inoperable component, according to an embodiment of the present disclosure.

FIG. 8 is a simplified diagrammatic representation of an example of a pressure waveform 700 associated with an impending inoperable component, according to an embodiment of the present disclosure. Referring to FIGS. 1 and 8, the pressure waveform 700 relates to ambient condition data detected by the ambient sensor 108, which may be an air pressure sensor. The pressure waveform 700 is stable until point 702, at which a toilet is flushed, and a valve opens, thereby causing a distorted vacuum force depression 704. As the flush cycle proceeds, the valve is closed at 706, and the pressure returns to a stable state 708.

As shown, the vacuum force depression 704 is distorted in that it varies significantly from the depression 504 shown in FIG. 6. Such a distorted vacuum force depression 504 may be indicative of an impending inoperable component, as determined by historical data stored in the monitoring center 122, for example. The impending inoperablity may be determined based on a predetermined difference between the depressions 504 and 704. The monitoring center 122 may determine that the waveform 700 represents ambient air pressure in relation to an impending inoperable component 102 based on historical data of numerous operative components operating over a particular time period. Thus, actual pressure data detected by the ambient condition sensor 108 is compared by one or both of the ambient condition analysis control unit 114 or the health status determination control unit 126 (and/or the control unit 114) in relation to a waveform template similar to the waveform 700 shown in FIG. 8. If the actual pressure data waveform as output by the ambient condition sensor 108 during a flush of the toilet is the same or substantially similar to the waveform template, the control unit 114 and/or the control unit 126 determines that the operative component 102 will be in inoperable within a short period of time, such as within a day, a week, a month, or the like, and should be replaced as soon as possible.

It is to be understood that the waveform 700 is merely a simplified example. Various other waveforms may be representative of ambient air pressure in relation to an impending inoperable component.

Referring to FIGS. 1 and 6-8, the control unit 114 and/or the control unit 126 may compare actual ambient pressure data as output by the ambient condition sensor 108 to various waveform templates that correlate with different health status of the ambient condition sensor 108. By comparing the actual received ambient pressure data with stored historical data, the control unit 114 and/or the health status determination control unit 126 may diagnose anomalies of the operative component 102, prognosticate or predict a date of inoperability, and send alerts regarding suggested replacement deadlines of the operative component 102. In at least one other embodiment, instead of (or in addition to) analyzing ambient pressure data, the ambient condition sensor 108 may include a temperature sensor, and the control unit 114 and/or the control unit 126 may analyze ambient temperature data. Further, instead of waveforms, the ambient condition data may be in various other forms (such as a raw data points, an average value over a particular time period, and/or the like), and the stored historical data may be in a similar form.

As described, embodiments of the present disclosure provide systems and methods of indirectly monitoring operative components 102 through detection and analysis of ambient conditions surrounding or otherwise proximate to the operative components 102. Operation of the operative components 102 affects one or more of the ambient conditions within the chamber 104. In at least one embodiment, the systems and methods do not directly measure or analyze any signal or output from the operative component 102.

Figure 9:
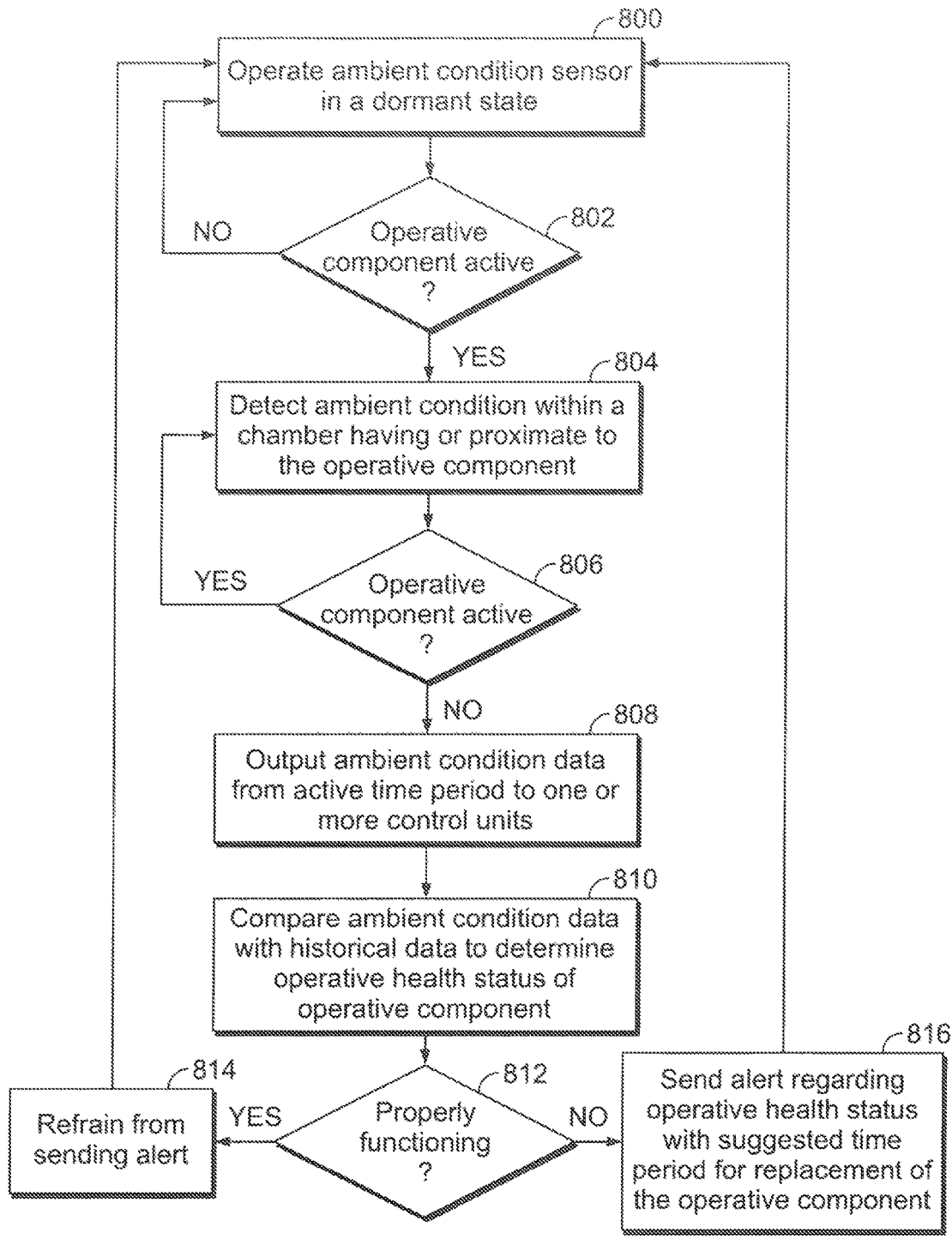
FIG. 9 illustrates a flow chart of a method for monitoring an operative component of a vehicle, according to an embodiment of the present disclosure.

FIG. 9 illustrates a flow chart of a method of monitoring an operative component of a vehicle, according to an embodiment of the present disclosure. Referring to FIGS. 1 and 9, the method begins at 800, at which the ambient condition sensor 108 may be operated in a dormant state (for example, a sleep mode) in order to conserve energy. The ambient condition sensor 108 may awaken based on a particular ambient pressure being generated (such as caused by flushing of a toilet), by activation of a button, lever or the like (such as a toilet plunger or button that is coupled to the ambient condition sensor 108), by opening, closing and/or locking of a door leading into the chamber 104, turning on/off a light, and/or the like. In at least one other embodiment, the ambient condition sensor 108 may periodically awaken within a predetermined time period, such as one or two milliseconds. Alternatively, the ambient condition sensor 108 may be operated in a fully active state whether or not the operative component 102 is active.

At 802, it is determined if the operative component is active. For example, a toilet flushing activates the operative component 102, such as a vacuum generator of a vacuum sub-system coupled to the toilet. Activation of the operative component may awaken the ambient condition sensor, and cause it to sample an ambient condition within a chamber coupled to (for example, containing, proximate to, or otherwise connected to) the operative component 102. If the operative component is not active, the method returns to 800 from 802. If, however, the operative component is active at 802, the method proceeds to 804, in which the ambient condition is detected. In at least one embodiment, the sampled ambient condition includes air pressure within the chamber 104 (such as a lavatory onboard an aircraft), and/or cabin air pressure (as detected by the ambient condition sensor, or an environmental sensor 120 coupled to the vehicle computer 112). Additionally, a flush button state, a vacuum pump state, and/or the like may also be detected and correlated with the detected ambient condition.

At 806, it is determined if the operative component 102 is still active. If the operative component is still active, the method returns to 804. If, however, the operative component 102 is no longer active at 806, the method proceeds to 808, in which the ambient condition sensor outputs ambient condition data from the activate time period to one or more control units, such as the control unit 114 and/or the control unit 126.

At 810, the control unit 114 and/or the control unit 126 compares the ambient condition data received from the ambient condition sensor 108 with historical data to determine an operative health status of the operative component 102. At 812, the control unit 114 and/or the control unit 126 determines whether the operative component 102 is properly functioning based on the comparison of 810. If the operative component is properly functioning, the method proceeds from 812 to 814, in which the control unit 114 and/or the control unit 126 refrains from sending an alert. The method then returns to 800.

The comparing operation at 810 may include comparing the ambient condition data to one or more ambient condition thresholds related to various operative health states of the operative component 102. The thresholds may include a normal operating threshold, a diminished capacity threshold, an impending inoperability threshold, inoperability, and/or the like.

If the operative component is not properly functioning (for example, functioning at a diminished capacity and/or impending inoperability), the method proceeds from 812 to 816, at which the control unit 114 and/or the control unit 126 sends an alert (such as an audio signal broadcast over a speaker, and/or a graphic or video signal shown on a monitor, screen, handheld device, printing a report, and/or the like) regarding the operative health status of the operative component 102, along with a suggested time period for replacement of the operative component 102. The method then returns to 800.

The ambient condition data may be received by the monitoring center 122. For example, the health status determination control unit 126 may store the received ambient condition data and store it within the data storage unit 128. The health status determination control unit 126 may utilize past, current, and future ambient condition data from various ambient condition sensors of various vehicles to determine, form, and refine the historical data.

As described above, the control unit 114 onboard the vehicle 106 and/or the control unit 126 of the remote monitoring center 122 compares the received ambient condition data output by the ambient condition sensor 108 with historical data stored in the data storage unit 116 and/or the data storage unit 128. In at least one embodiment, the control unit 114 and/or the control unit 126 matches the received data (such as pressure waveforms) with a stored pattern within the historical data that relates to a particular health status of the operative component 102. Further, the control unit 114 and/or the control unit 126 may correlate the ambient condition data with aircraft data (as detected by the environmental sensors 120) to further refine diagnostic and prognostic capabilities.

As described above, embodiments of the present disclosure provide systems and methods of monitoring components, such as those of a vehicle. Embodiments of the present disclosure provide systems and method of predicting when a component of a vehicle is to be replaced, which allows the component to be replaced at a time when the vehicle is not in service (thereby eliminating, minimizing, or reducing departure delays).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A component monitoring system that is configured to indirectly monitor an operative health status of an operative component, the component monitoring system comprising:
an ambient condition sensor within a chamber;
an operative component coupled to the chamber, wherein the ambient condition sensor is configured to sample an ambient condition within the chamber when the operative component is active, wherein the ambient condition sensor is configured to output ambient condition data indicative of the ambient condition sampled by the ambient condition sensor;
at least one control unit that is in communication with the ambient condition sensor, wherein the at least one control unit is configured to indirectly determine the operative health status of the operative component through an analysis of the ambient condition data; and
one or more environmental sensors in communication with the at least one control unit, wherein the at least one control unit is configured to correlate one or more environmental parameters detected by the one or more environmental sensors with the ambient condition data.

2. The component monitoring system of claim 1, wherein the ambient condition sensor is not coupled to the operative component.

3. The component monitoring system of claim 1, wherein the ambient condition sensor is an ambient air pressure sensor, wherein the chamber is a lavatory onboard a vehicle, and wherein the operative component is a vacuum generator of a vacuum sub-system coupled to a toilet within the lavatory.

4. The component monitoring system of claim 1, wherein the ambient condition sensor is an ambient temperature sensor.

5. The component monitoring system of claim 1, wherein the at least one control unit is configured to store historical data regarding a plurality of operative health status stages of the operative component, and wherein the at least one control unit is configured to compare the ambient condition data with the plurality of operative health status stages of the operative component to determine the operative health status of the operative component.

6. The component monitoring system of claim 5, wherein the plurality of operative health status stages include proper functioning, diminished capacity, and impending inoperability.

7. The component monitoring system of claim 1, wherein the ambient condition sensor is in a dormant state at least for a portion of time when the operative component is inactive.

8. The component monitoring system of claim 1, wherein the one or more environmental parameters comprise one or more of an altitude, latitudinal position, longitudinal position, a velocity of a vehicle, or an acceleration of the vehicle.

9. The component monitoring system of claim 1, wherein the at least one control unit is onboard a vehicle.

10. The component monitoring system of claim 1, wherein the at least one control unit is within a monitoring center that is remotely located from the chamber.

11. The component monitoring system of claim 1, wherein the at least one control unit is configured to predict a time of replacement of the operative component based on the analysis of the ambient condition data.

12. A component monitoring method for indirectly monitoring an operative health status of an operative component, the component monitoring method comprising:
disposing an ambient condition sensor within a chamber;
coupling an operative component to the chamber;
using the ambient condition sensor to sample an ambient condition within the chamber when the operative component is active;
outputting ambient condition data, via the ambient condition sensor, that is indicative of the ambient condition sampled by the ambient condition sensor;
communicatively coupling at least one control unit to the ambient condition sensor;
analyzing the ambient condition data with the at least one control unit;
correlating one or more environmental parameters sampled by one or more environmental sensors with the ambient condition data; and
indirectly determining the operative health status of the operative component through the analyzing.

13. The component monitoring method of claim 12, wherein the ambient condition sensor is an ambient air pressure sensor, wherein the chamber is a lavatory onboard a vehicle, and wherein the operative component is a vacuum generator of a vacuum sub-system coupled to a toilet within the lavatory.

14. The component monitoring method of claim 12, further comprising:
storing historical data regarding a plurality of operative health status stages of the operative component in at least one data storage unit, and wherein the analyzing comprises comparing the ambient condition data with the plurality of operative health status stages of the operative component.

15. The component monitoring method of claim 14, wherein the plurality of operative health status stages include proper functioning, diminished capacity, and impending inoperability.

16. The component monitoring method of claim 12, further comprising operating the ambient condition sensor in a dormant state at least for a portion of time when the operative component is inactive.

17. The component monitoring method of claim 12, further comprising using the at least one control unit to predict a time of replacement of the operative component based on the analyzing.

18. A vehicle comprising:
a lavatory including a toilet coupled to a vacuum sub-system having at least one operative component coupled to the lavatory;
an ambient condition sensor within the chamber, wherein the ambient condition sensor is configured to sample an ambient air pressure within the lavatory when the toilet is flushed, wherein the ambient condition sensor is configured to output ambient pressure data indicative of the ambient fir pressure detected by the ambient condition sensor, wherein the ambient condition sensor is in a dormant state at least for a portion of time when the operative component is inactive, wherein the ambient condition sensor is not coupled to the operative component;
a control unit onboard the vehicle that is in communication with the ambient condition sensor, wherein the control unit is configured to indirectly determine the operative health status of the operative component through an analysis of the ambient pressure data within the lavatory during operation of the operative component, wherein the control unit is configured to compare the ambient pressure data with a plurality of operative health status stages of the operative component to indirectly determine the operative health status of the operative component, wherein the plurality of operative health status stages include proper functioning, diminished capacity, and impending inoperability, wherein the control unit is configured to predict a time of replacement of the operative component based on the analysis of the ambient condition data; and one or more environmental sensors in communication with the control unit, wherein the control unit is configured to correlate one or more environmental parameters detected by the one or more environmental sensors with the ambient condition data, wherein the one or more environmental parameters comprise one or more of an altitude, latitudinal position, longitudinal position, a velocity of the vehicle, or an acceleration of the vehicle.

19. A component monitoring system comprising:
an ambient air pressure sensor within a lavatory onboard a vehicle;
a vacuum generator of a vacuum sub-system coupled to a toilet within the lavatory, wherein the ambient condition air pressure sensor is configured to sample an ambient air pressure within the lavatory when the vacuum generator is active, wherein the ambient air pressure sensor is configured to output ambient air pressure data indicative of the ambient air pressure sampled by the ambient air pressure sensor; and
at least one control unit that is in communication with the ambient air pressure sensor, wherein the at least one control unit is configured to indirectly determine the operative health status of the vacuum generator through an analysis of the ambient air pressure data.

20. The component monitoring system of claim 19, wherein the ambient air pressure sensor is not coupled to the vacuum generator.

21. The component monitoring system of claim 19, wherein the at least one control unit is configured to store historical data regarding a plurality of operative health status stages of the vacuum generator, and wherein the at least one control unit is configured to compare the ambient air pressure data with the plurality of operative health status stages of the vacuum generator to determine the operative health status of the vacuum generator.

22. The component monitoring system of claim 21, wherein the plurality of operative health status stages include proper functioning, diminished capacity, and impending inoperability.

23. The component monitoring system of claim 19, wherein the ambient air pressure sensor is in a dormant state at least for a portion of time when the vacuum generator is inactive.

24. The component monitoring system of claim 19, wherein the at least one control unit is onboard the vehicle.

25. The component monitoring system of claim 19, wherein the at least one control unit is within a monitoring center that is remotely located from the lavatory.

26. The component monitoring system of claim 19, wherein the at least one control unit is configured to predict a time of replacement of the vacuum generator based on the analysis of the ambient air pressure data.

27. A component monitoring method comprising:
disposing an ambient air pressure sensor within a lavatory onboard a vehicle;
coupling a vacuum sub-system to a toilet of the lavatory, wherein the vacuum sub-system includes a vacuum generator;
using the ambient air pressure sensor sensor to sample an ambient air pressure within the lavatory when the vacuum generator is active;
outputting ambient air pressure data, via the ambient air pressure sensor, that is indicative of the ambient air pressure sampled by the ambient air pressure sensor;
communicatively coupling at least one control unit to the ambient air pressure sensor;
analyzing the ambient air pressure data with the at least one control unit; and
indirectly determining the operative health status of the vacuum generator through the analyzing.

28. The component monitoring method of claim 27, further comprising:
storing historical data regarding a plurality of operative health status stages of the vacuum generator in at least one data storage unit, and wherein the analyzing comprises comparing the ambient air pressure data with the plurality of operative health status stages of the vacuum generator.

29. The component monitoring method of claim 27, wherein the plurality of operative health status stages include proper functioning, diminished capacity, and impending inoperability.

30. The component monitoring method of claim 27, further comprising operating the ambient air pressure sensor in a dormant state at least for a portion of time when the vacuum generator is inactive.

31. The component monitoring method of claim 27, further comprising using the at least one control unit to predict a time of replacement of the vacuum generator based on the analyzing.

* * * * *